Figure 1:
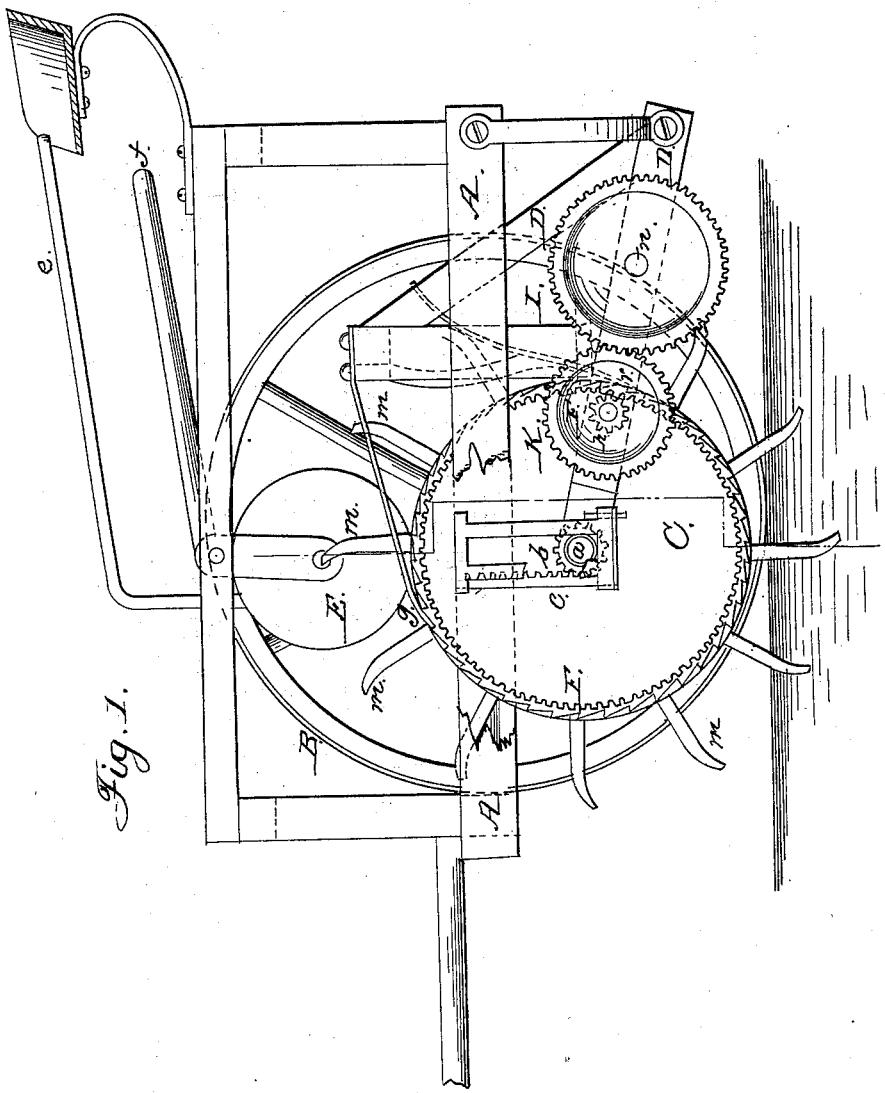

2 Sheets—Sheet 1.

E. J. FRASER.
Rotary-Cultivator.

No. 58,543.

Patented Oct. 2, 1866.

WITNESSES:
F. A. Jackson
J. A. Service

INVENTOR:
E. F. Fraser
Per Munn & Co.
Attorneys

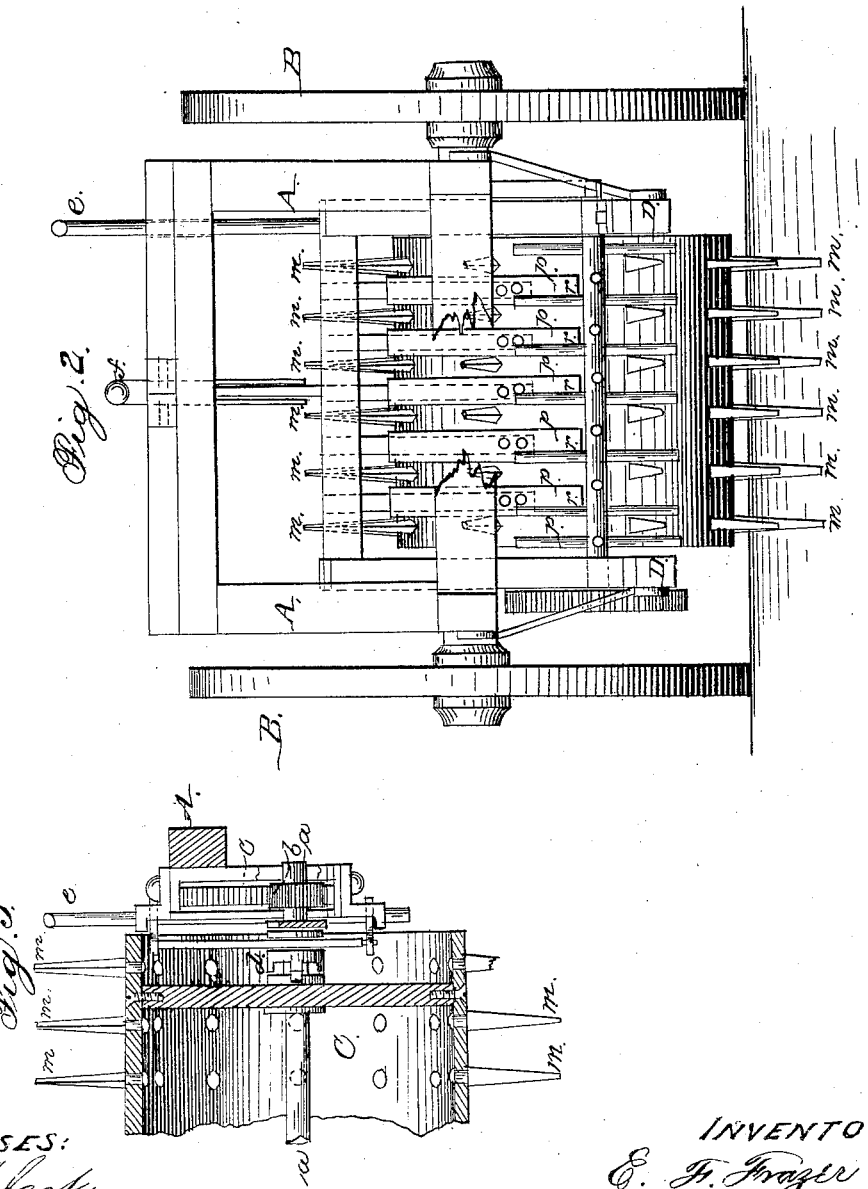

UNITED STATES PATENT OFFICE.

E. J. FRASER, OF ERIE, PENNSYLVANIA, ASSIGNOR TO HIMSELF AND ORANGE NOBLE, OF SAME PLACE.

IMPROVEMENT IN ROTARY SPADING-MACHINES.

Specification forming part of Letters Patent No. 58,543, dated October 2, 1866.

*To all whom it may concern:*

Be it known that I, E. J. FRASER, of Erie, in the county of Erie and State of Pennsylvania, have invented a new and Improved Rotary Spading-Machine; and I do hereby declare that the following is a full, clear, and exact description thereof, which will enable others skilled in the art to make and use the same, reference being had to the accompanying drawings, forming part of this specification, in which—

Figure 1 is a side elevation of the machine. Fig. 2 is an inverted plan. Fig. 3 is a partial section on the line *x x*, Fig. 1, showing the application of a shifting-clutch.

Similar letters of reference indicate like parts.

This invention relates to improvements in a rotary spading-machine for rendering it an effective and useful agricultural implement.

The distinguishing principles of construction and operation of this machine consist in the arrangements for shifting the traction from the driving-wheels to the rotary spader or digger, by which all the weight of the machine and the driver, and any accessory loading which may be required, rests upon it and pushes the spades deep into the ground, the only operative force being that derived from the team, and, vice versa, shifting the traction from the rotary spader to the wheels by which the machine travels with the spades elevated clear of the surface of the ground. Arrangements are also provided for thoroughly breaking the clods and pulverizing the soil turned up by the rotary spader, and also for keeping the spades and cylinder which carries them free from adhering earth and trash, which would otherwise clog and render the machine inoperative.

This machine, with one man and a four-horse team, will spade or plow from ten to fifteen acres a day, and thus furnish the agriculturist with a valuable labor-saving implement.

A represents a truck or supporting-frame. B B are driving-wheels. C is a hollow rotary cylinder, made smooth and even on the outside. A draft-pole (indicated in red) is attached in front and a driver's seat in the rear on the top of the machine. Secured firmly to the under side of the main truck A, in the rear part, is a subordinate frame, D, on which is directly suspended the cylinder C and the gearing for operating it, and its connected parts belonging to the spading apparatus.

The cylinder-shaft *a a*, Figs. 1 and 3, has on each end a pinion, *b*, which works in a vertical rack, *c*, which is fastened at the upper end to each side of the truck A near the axles of the wheels, and at the lower end to the front part of each side of the subordinate frame D.

On the face of the cylinder C are set rows of sharp-pointed spades or teeth *m m*, which are wedge-shaped on the back and curve forward slightly to penetrate the ground readily. The cylinder is loose on the shaft *a a*, and is put in and out of connection with it by means of a shifting clutch, *d*, feathered on the shaft and placed at one end of the cylinder. (See Fig. 3.) This clutch is thrown in and out of gear by a side lever, *e*, which passes up to the top of the machine near the right hand of the driver, who works it readily at pleasure for raising and lowering the cylinder. Placed above the cylinder C, and attached to a lever-arm, *f*, Fig. 1, is a friction roller or bearer, E, which is elevated out of the way to allow the cylinder to be raised, and is depressed to bear down upon its periphery when the cylinder is lowered for spading.

When the friction-roller E has been elevated, and the clutch *b* is connected with the cylinder, the shaft *a a* turns with it as the team travels forward. The pinions *b* on each side of the machine then climb up the rack *c*, and thus raise the cylinder and suspend it at the top, so that the spades or teeth *m* shall be clear of the ground, and the driving-wheels B B shall touch it and travel with the whole machine; but if the clutch is disconnected from the cylinder, the shaft *a a* being released, the cylinder will fall and the spades will penetrate the ground to the proper depth, and thus lift the driving-wheels, so that the traction will be transferred to the rotary spader, and all the weight of the machine will rest upon it.

One of the chines or edges of the rotary cylinder is toothed on the outside, forming a ratchet-wheel, as shown in Fig. 1, in which the spring-dog *g* catches, to prevent a reverse movement of the cylinder when it is elevated and the machine is turned or moved from place to place.

The inside of the chine is cogged, forming an epicycloidal wheel, F, into which gears a small pinion, h, Fig. 1, affixed to a short shaft, i, passing through and supported by the frame D, and carrying on its outer end a spur-wheel, k, which engages in a larger spur-wheel, l, on a shaft, n, which shaft also passes through and is supported in bearings in the frame D on both sides of the machine behind the spading-cylinder. On the shaft n are placed four sets of arms, p p, which are so arranged as to pass between and near to the sides of the rotary spades m, and by their revolution clear the spades of earth and trash, while at the same time they pulverize the soil thoroughly.

Between and just clearing the sides of the spades m are placed flat spring-scrapers r r, which are attached to the frame D. The lower ends press upon the face of the cylinder and clear it of adhering earth and trash while it revolves in spading.

The top of the machine is covered with a roof or flooring, through which the levers e and f pass convenient to the driver, so that he can manage the operation of the machine as described with ease and safety.

Having described the construction and operation of my invention, what I claim as new, and desire to secure by Letters Patent, is—

1. The smooth-faced cylinder C, set with rows of teeth or spades m, and hung on the free shaft a a, in combination with the shifting-clutch d and the vertical rack c, and pinion b, for raising and lowering the cylinder, constructed and operated substantially as and for the purposes herein described.

2. The rotating pulverizing-arms p, in combination with the spading-cylinder C, and connected therewith by the gear-wheels h k l, operated by the epicycloidal wheel F on the chine of the cylinder, constructed and operated substantially as and for the purposes herein specified.

3. The spring-scrapers r and the friction-roller or bearer E, in combination with the spading-cylinder C, constructed and operated substantially as and for the purposes herein described.

E. J. FRASER.

Witnesses:
SELDEN MARVIN,
J. J. TOMY.